(No Model.)
C. C. COULSON.
TREE PROTECTOR.
No. 595,149. Patented Dec. 7, 1897.
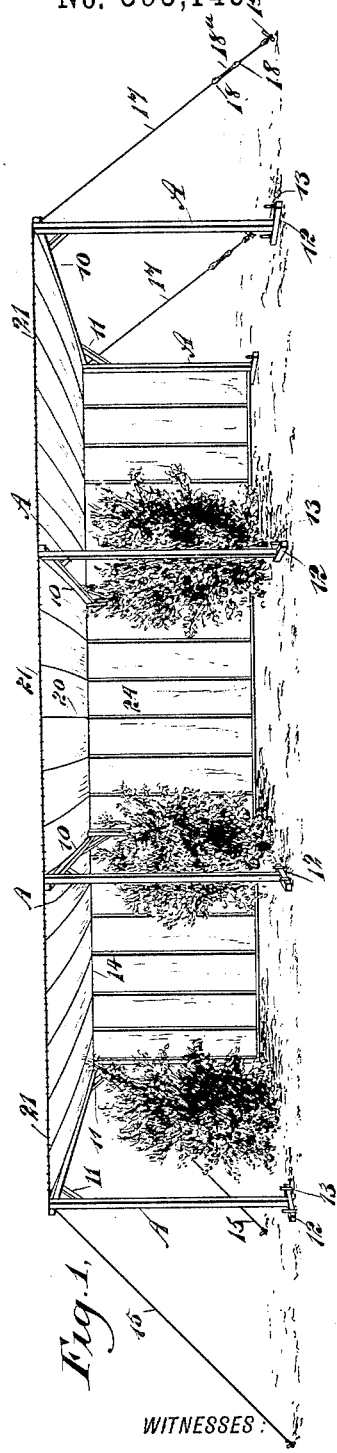
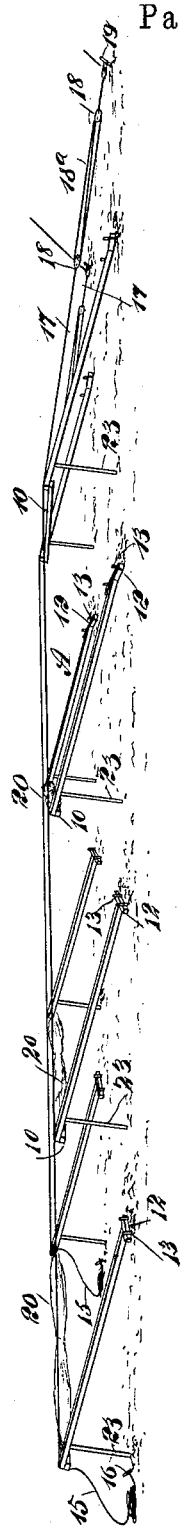
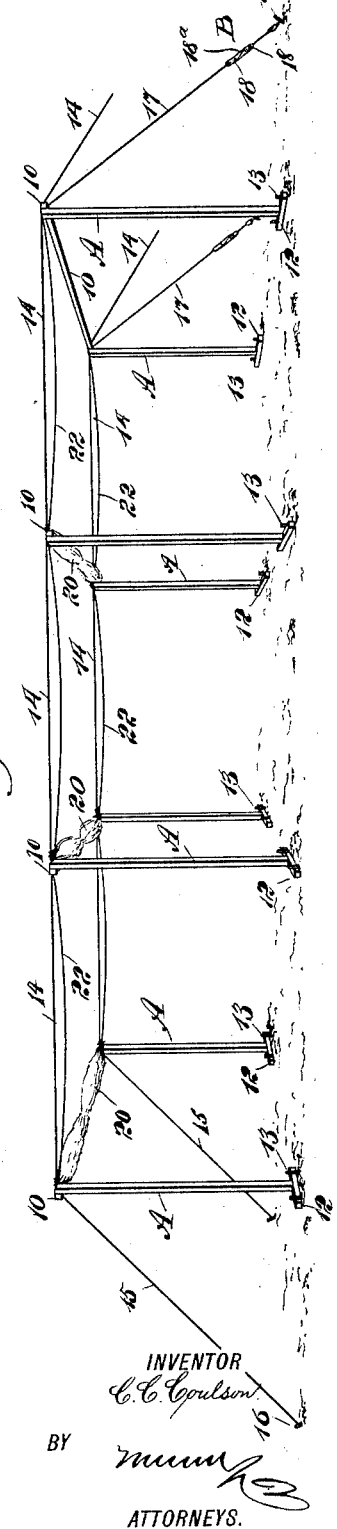
WITNESSES:
Edward Thorpe.
INVENTOR
C. C. Coulson
BY
ATTORNEYS.

UNITED STATES PATENT OFFICE.

CHARLES C. COULSON, OF RIVERSIDE, CALIFORNIA.

TREE-PROTECTOR.

SPECIFICATION forming part of Letters Patent No. 595,149, dated December 7, 1897.

Application filed January 20, 1897. Serial No. 619,868. (No model.)

*To all whom it may concern:*

Be it known that I, CHARLES CALLAM COULSON, of Riverside, in the county of Riverside and State of California, have invented a new and useful Improvement in Tree-Protectors, of which the following is a full, clear, and exact description.

The apparatus has been primarily designed to protect orange and lemon trees from damage by frost in southern California and other climates where frost invariably occurs only upon very still and perfectly clear nights and may be said to be dangerous to the trees and to the fruit for only a few hours at a time.

A further object of the invention is to provide a protector for the trees or for large plants which when not in use will lie in compact form on the ground and which may in an exceedingly short space of time be raised, so as to provide a canopy over the trees or plants and likewise, when desired, shelter at the sides of the canopy thus provided.

Another object of the invention is to construct the protector in such manner that it will have the same effect as a cloud-covered sky, which, occurring in a frosty season, at once raises the temperature several degrees.

Another object of the invention is to provide for an expeditious and convenient manipulation of the material forming the canopy or protector, which material is capable of being furled close to uprights provided to support the canopy and quickly drawn from one support to another.

Another object of the invention is to construct the entire device in such manner that in the event injurious winds should arise the device may be quickly carried to a position close to the ground, where it will not be affected by the violent weather.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the protector erected over the trees it is designed to shield. Fig. 2 is a perspective view of the uprights of the protector, their connections and canopy, the latter being folded upon the uprights, the entire device being in its lowest position; and Fig. 3 is a perspective view of the device in an upright position with the canopy folded.

Any desired number of uprights A, arranged in pairs, are employed, the uprights of each pair being arranged in transverse alinement, one at each side of the row of plants or trees to be shielded. Each pair of uprights A is connected at the top by a cross-bar 10, and braces 11 may be used where the uprights connect with the cross-bars, as shown in Fig. 1, if it is found desirable.

Each upright A has a foot-block 12 secured thereto, extending beyond opposite sides, and the foot-blocks are placed transversely of the rows of trees and rest upon the ground, while stakes 13 or their equivalents are driven into the ground at one side of each foot-block 12, the stakes being placed in engagement with the sides of the foot-blocks that face the ends of the structure at which the elevating mechanism is located. Each pair of uprights and the connecting-bar therefor, together with the foot-blocks 12 belonging to the uprights, may be said to constitute a frame, and the frames employed in connection with a row of trees are connected at the top near the sides by means of wires 14 or their equivalents, the wires extending from the frame at the right to the frame at the left hand end of the row.

Guy ropes or wires 15 are attached to the left-hand frame of a row—for example, usually at the top—and these guy-ropes are secured to the ground by means of stakes 16. When the various frames are in perpendicular position, the guy ropes or wires 15 will be taut, as illustrated in Fig. 1; but when the frames are in an inclined position more or less of the guy ropes or wires will be coiled upon the ground, as illustrated in Fig. 2.

At the opposite or right-hand end of a series of frames hoist ropes, cords, or wires 17 are secured to the upper portion of the frame, and preferably these hoist-ropes are connected with hoisting-tackle B, the said tackle being connected with stakes 19, that are driven in the ground. Said hoisting-tackle usually consists of pulleys 18 and ropes 18ª passed over the said pulleys, one pulley being attached to the lower end of each hoist-rope 17 and the other pulley being connected with the stake 19 belonging to the said hoisting-rope, as is best shown in Fig. 2.

It will be observed that by using the feet 12 for the frames and the stakes 13 the frames may be rocked upon the ground and carried rapidly from an inclined to an upright position, and vice versa, without slipping, the said construction being both durable and economic; but the frames may have a hinged connection with the ground in any other desired manner.

A canopy 20 is provided for the space between each two opposing frames of a row. These canopies may be made of any desired material, canvas being usually employed, and they may be made in one piece or in sections, and whether in one piece or in sections the edge of the canopy nearest to one of the cross-bars—for example, the left-hand cross-bar of a frame—is attached to the said cross-bar, and the ends of the canopy are provided with rings 21, held to slide upon the wires 14 or any other track that may be used.

When the device is not in use, the canopies are folded or reefed to the cross-bars, as shown in Figs. 2 and 3, and when the frames are elevated the canopies will still remain folded upon the cross-bars, but will have been released from their fastening devices. Draw strings or cords 22 are located at each side of the series of frames at the top, and these draw strings or cords may be connected with all the canopies, so as to unfold them simultaneously, or independent draw-strings may be connected with each canopy.

When the frames have been lowered, as illustrated in Fig. 2, they are supported a predetermined distance from the ground by means of props 23. This is done in order that the frames or the material of the canopy shall not be affected by the moisture of the ground.

It is sometimes found desirable to provide curtains 24, in which event these curtains are strung upon the tracks 14 and are carried downward from one or both sides of the row of frames to the ground, and curtains may also be placed at the ends of a row of frames if it be deemed desirable.

Having thus described my invention, I claim as new and desire to secure by Letters Patent—

1. A protector for trees or large shrubs, consisting of frames arranged to rest on the ground and pivoted at their lower ends, canopies carried by the frames, and devices for controlling the movement of the frames, as set forth.

2. A protector for trees or large shrubs, consisting of a series of frames arranged to straddle a row of plants or trees, the bottom of said frames having pivotal connection with a support, canopies carried by the frames, stakes located at one end of the row of frames, and devices at the opposite end of the said row of frames for the purpose of raising and lowering the said frames, as and for the purpose set forth.

3. A protector for trees or shrubs, consisting of a series of frames having pivotal connection with the ground, the said frame straddling the rows of trees or plants, canopies carried by the frames, being adjustably supported thereby, and devices for raising the said frames from a lower to an upright position, and devices for limiting the movement of the frames substantially as described.

4. A protector for trees or shrubs, consisting of frames arranged to straddle a row, the bottoms of the said frames being adapted for pivotal engagement with the ground, tracks connecting the various frames, and means for simultaneously raising and lowering the connected frames, as and for the purpose specified.

5. A protector for trees or shrubs, consisting of frames arranged to straddle a row, the bottoms of the said frames being adapted for pivotal engagement with the ground, tracks connecting the various frames, means for simultaneously raising and lowering the connected frames, and canopies adapted to extend from one frame to the other, the canopies being mounted to travel on the aforesaid tracks, and devices for stretching the canopies, as and for the purpose specified.

6. A tree-protector, consisting of uprights pivotally supported on the ground, canopies on said uprights, and means for holding said uprights in raised or lowered position, substantially as set forth.

7. A support for a tree or shrub protector, consisting of a frame adapted to span a row of plants or trees, the said frame comprising uprights and a cross-bar, the uprights being arranged for hinged connection with the ground or a support adjacent thereto, as and for the purpose specified.

8. A frame for a tree or shrub protector, consisting of uprights, a cross-bar connecting the uprights, feet located at the lower ends of the uprights, and stakes arranged for engagement with a side surface of the said feet, whereby the frames may be raised or lowered without danger of slipping, as and for the purpose set forth.

9. A protector for trees and other shrubs, consisting of a series of frames, tracks connecting the frames, canopies adapted to slide upon said tracks, foot-blocks resting on the ground and supporting said frames, and stakes engaging said foot-blocks, whereby the frames may be rocked to a recumbent or an upright position, substantially as set forth.

CHARLES C. COULSON.

Witnesses:
CHARLES P. CHRISTENSON,
RICHARD H. CARR.